United States Patent [19]

Dodge et al.

[11] 3,937,325
[45] Feb. 10, 1976

[54] CARTRIDGE WITH LOCK STABILIZATION

[75] Inventors: Thomas W. Dodge, Boulder; Helfried O. Rinkleib; William J. Rueger, both of Longmont, all of Colo.

[73] Assignee: International Business Machines Corporation, Armonk, N.Y.

[22] Filed: Aug. 5, 1974

[21] Appl. No.: 494,939

[52] U.S. Cl. ............... 206/387; 206/406; 220/306; 242/197
[51] Int. Cl.² ....................................... B65D 85/67
[58] Field of Search ............ 206/387, 389, 403–406, 206/408; 215/12 R, 220; 220/9 R, 306–307, 323–324, 326; 242/197; 267/161; 340/17

[56] References Cited
UNITED STATES PATENTS

| | | | |
|---|---|---|---|
| 2,348,225 | 5/1944 | Petty | 267/161 X |
| 2,690,529 | 9/1954 | Lindblad | 267/161 X |
| 3,344,397 | 9/1967 | Elliott et al. | 340/17 |
| 3,536,315 | 10/1970 | Jenkin | 267/161 |
| 3,825,208 | 7/1974 | Johnston et al. | 242/197 |
| 3,848,761 | 11/1974 | Libit | 215/220 |

*Primary Examiner*—George E. Lowrance
*Assistant Examiner*—Steven E. Lipman
*Attorney, Agent, or Firm*—Donald W. Margolis

[57] ABSTRACT

In a cartridge comprised of a base member including a hub for receiving a wound web and a shell cover to generally enclose the winding surface of the hub, the shell cover has been modified to prevent unintentional disengagement of the shell from the base. The base member and shell each carry a portion of a locking mechanism which enables them to be releasably locked together in a hub enclosing relationship. The locking mechanism normally requires a separate tool to disengage it when separation of the base and shell is desired. This invention concerns modification of the cartridge and shell which prevents unintentional disengagement of the base and shell due to kinetic shocks, such as dropping on a hard surface.

11 Claims, 5 Drawing Figures

U.S. Patent   Feb. 10, 1976   3,937,325
FIG. 1
PRIOR ART
FIG. 2
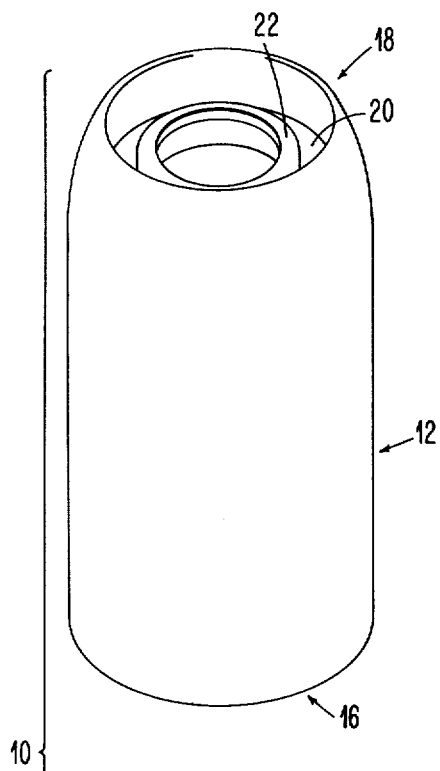
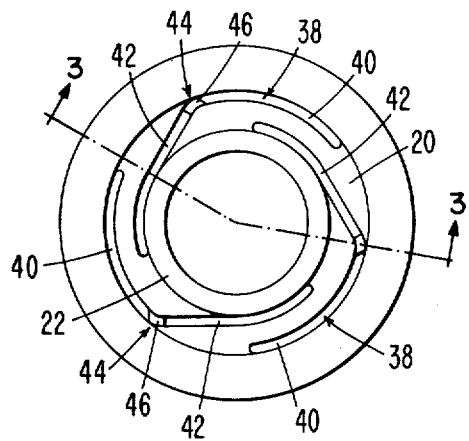
FIG. 3
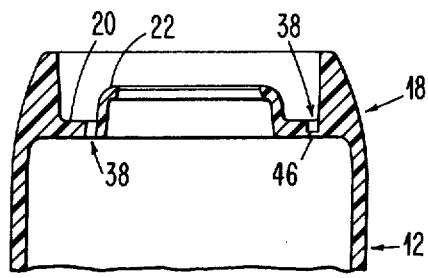
FIG. 4
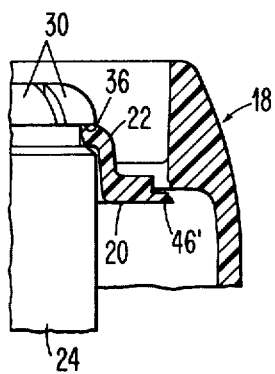
FIG. 5
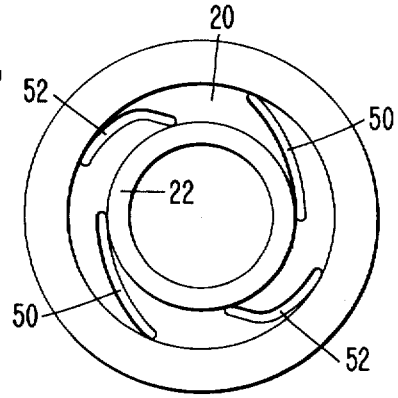

CARTRIDGE WITH LOCK STABILIZATION

BACKGROUND OF THE INVENTION

This invention relates to a cartridge including a central locking mechanism which cartridge has been modified to avoid unintentional disengagement of the locking mechanism.

Electronic data processing utilizes large volumes of magnetic recording media in the form of flexible webs. In use, magnetic webs have most often been in the form of tape wound on a flange protected hub or reel and brought into interaction with one or more transducers by a tape transport device. When not in use, it is necessary for magnetic tape wound on a reel to be stored in an environment which provides protection from contamination and shock while still maintaining it in a readily accessible condition. As the use of magnetic tape within data processing systems is extremely wide, some systems requiring the use of thousands of spools of tape, it becomes a problem to store the tape and retrieve it from storage quickly and easily. Library configurations have been proposed for automatically accessing tape, for example in cartridges, and transporting the cartridges to a processing station automatically; see, for example, copending application Ser. No. 304,698, filed Nov. 8, 1872, by C. E. Peterson et al, assigned to the assignee hereof now U.S. Pat. No. 3,354,604. Such automatic handling imposes severe demands on the tape and any cartridge device used to store and protect it. Such a cartridge device should be strong, light-weight, and subject to easy storage, unloading, opening and closing. For data security in automatic library systems where human interaction with the storage device is not required, the cartridge can be advantageously supplied with a lock which does not normally respond to manual manipulation, but which requires a separate mechanical tool to allow access to the magnetic media. Such a device is described in U.S. Pat. No. 3,825,208 by D. H. Johnston et al, and assigned to the assignee hereof.

Because severe mechanical shocks or contamination can cause loss of data on magnetic tape, the cartridge device should also be carefully designed to shield the tape from shocks and to avoid accidental opening with its attendant unwinding and contamination when subjected to severe kinetic shock. That is, the device should protect the magnetic tape from shock and avoid accidental opening when dropped, for example. This, in turn, reduces the exposure of the magnetic media to data errors caused by shock and contamination.

Additionally, the amount of force and type of forces capable of disengaging the locking mechanism should be controllable. The device should be designed to allow the use of a separate tool applying minimum force to disengage the locking mechanism without being likely to open unintentionally when greater random forces are applied to the locked cartridge, for example, in the form of a kinetic shock.

SUMMARY OF THE INVENTION

The present invention comprehends a modification of the type of cartridge described in U.S. Pat. No. 3,825,208. Such a cartridge includes a base member, a cover member, and a locking mechanism integral with the base and cover members for releasably locking said members in a hub enclosing relationship. The base member is in the form of a hub having a single flange, while the end of the hub opposed to the flange carries a plurality of locking fingers, each finger having a radially extending portion at the outward end portion. The cover shell member is generally cylindrical in shape with an open end to allow the hub to be inserted within the shell and a partially closed end including a locking shoulder for engaging the radially extending portions of the locking fingers. In the present invention the partially closed end of the shell is designed to prevent unintentional disengagement of the locking members when kinetic shocks are applied to the locked cartridge.

In one preferred embodiment, the partially closed end of the shell includes a centrally located annular locking shoulder supported by and connected to the body of the shell by a disk. The disk carries a plurality of apertures designed to allow limited axial movement and oscillation of the central locking shoulder when the cartridge is subjected to axial shocks. The apertured disk is capable of maintaining the locking shoulder in substantially stable and unmoving axial position during locking and normal tool manipulated unlocking procedures. Each aperture in the disk is preferably of generally the same form, and includes a circumferential portion radially removed from the locking shoulder and a portion spiraling inwardly into juxtaposition with the locking shoulder. At the juncture of the circumferential portion and the spiral portion of the aperture, a thin, but preferably monolithic and integral, portion of the disk bridges the aperture. This bridging portion is of lesser thickness than the depth of the aperture.

With appropriately selected dimensions and materials such an apertured disk arrangement provides a relatively axially inflexible support for the locking shoulder during normal locking and unlocking operations. Such an arrangement also allows the locking shoulder to flex slightly upon the application of slight axial kinetic force to the cartridge, while upon the application of greater axial forces one or more of the portions bridging the apertures may fracture. The fracturing of a bridge dissipates great amounts of kinetic energy. After the bridge is broken the apertured disk allows the locking shoulder to axially flex and oscillate to a greater extent, thus dissipating even more energy. These movements in response to kinetic shock, including bridge breaking, all take place without normally allowing disengagement between the locking fingers and the locking shoulder. After being subjected to sufficient forces to fracture the bridges, the cartridge continues to be capable of being locked and unlocked in a normal manner and to continue to resist unintentional disengagement due to kinetic shocks.

Modifications of the apertured disk supporting the locking shoulder can be made to obtain substantially the same result. The number of apertures the shape of the apertures, the width of the apertures, the thickness of the disk, the presence or absence of bridging portions, and the number of bridging portions can all be modified, in accordance with the requirements of the mechanism, to provide a cartridge which unlocks with minimum forces when the proper unlocking tool is utilized, but which cartridge is capable of being subjected to substantial kinetic forces without unintentional disengagement.

The foregoing and other objects, features, and advantages of the invention will be apparent from the following more particular description of the preferred embodiments of the invention, as illustrated in the accompanying drawing.

BRIEF DESCRIPTION OF THE DRAWING

FIG. 1 is an exploded simplified perspective view of a prior art base member and a cover member which constitute a storage cartridge capable of employing the present invention.

FIG. 2 is an enlarged and simplified plan view of the top of the cover of FIG. 1 embodying one form of the present invention.

FIG. 3 is a simplified enlarged fragmentary cross-sectional view taken along lines 3—3 of FIG. 2, showing the apertures in the disk supporting the locking shoulder and a bridge across an aperture.

FIG. 4 is a still further enlarged fragmentary partially cross-sectional diagrammatic view of the cover of FIG. 3 locked to a base member to form a cartridge which cartridge has been subjected to substantial kinetic forces causing the bridge across the aperture to fracture and a portion of the disk to displace.

FIG. 5 is a simplified plan view of the top of another cover showing one alternative embodiment of the present invention.

DESCRIPTION OF THE PREFERRED EMBODIMENTS

Referring now more particularly to the drawing, like numerals indicate like parts and structural features in the various views and diagrams. The simplified details of a cartridge capable of utilizing this invention are shown in FIG. 1. Cartridge 10 is shown with shell cover 12 separated from base member 14. Cover 12 is generally cylindrical in shape with an open end 16 and a tapered and partially closed end 18. End 18 carries annular flange disk 20 which disk in turn supports locking shoulder 22 for engagement by base 14 as described hereinafter.

Base 14 is in the form of a single flange reel including cylindrical hub portion 24 with flange 26 fixed to the hub at one end. End 28 of hub 24 opposed to flange 26 is hollow and carries a plurality of flexible locking fingers 30. The hub is designed to carry a flexible wound web 32, shown in phantom, for example in the form of magnetic tape, on the hub surface between flange 26 and flexible fingers 30. Additional details of the cartridge are set forth in previously noted U.S. Pat. No. 3,825,208.

When cover 12 and base 14 are brought together axially, hub 24 and web 32 extend into open end 16 and are enclosed by the cover. As axial movement is continued, cam surfaces 34 of flexible fingers 30 come into contact with locking shoulder 22 which is in the form of a rigid annular flange. Axial movement of cam surface 34 against rigid shoulder 22 causes the fingers to flex inwardly until they are able to pass into and through the annulus formed by locking shoulder 22. When closure is completed, cam portion 34 of each finger extends axially beyond locking shoulder 22, so that the laterally inward constraint of locking shoulder 22 is no longer applied to fingers 30. In this unconstrained condition, flexible fingers 30 straighten and radially extending portions 36 of the fingers lock on shoulder 22, see FIG. 4 and U.S. Pat. No. 3,825,208.

With locking shoulder 22 and locking fingers 30 thus locked together, base 14 cannot normally be removed from within cover 12 without first disengaging all of the fingers from the shoulder with a separate tool. This is explained in detail in U.S. Pat. No. 3,825,208. The resiliency and dimensions of the fingers is such that ordinary axial forces exerted between the locked cover and base member will not cause release of the fingers from the locking shoulder. Similarly, the number, array, resiliency, and dimensions of the fingers also normally prevents manual release of the fingers from the shoulder. The fingers are arrayed in such a manner, and are of such thickness, that manual manipulation cannot normally depress all of the fingers simultaneously without great difficulty. As long as one finger 30 remains in locking contact with shoulder 22, separation of the base and cover members is not possible. Furthermore, the cartridge is preferably designed with cover 12 completely enclosing base 14. No substantial lateral portion of the base extends outside of the cover when the cartridge is closed. With the base thus enclosed, it provides no portion which can be readily grasped to actively pull the base from the cover and overcome the locking relationship between fingers 30 and locking shoulder 22.

When it is desired to unlock the cartridge for removal of cover 12 from base 14, it is normally necessary to utilize a separate tool, not shown herein, but see U.S. Pat. No. 3,825,208. However, it has been found that while the cartridge's locking mechanism is quite secure from being opened without a separate tool, when the cartridge falls from an elevated position onto a hard surface, in a small percentage of falls cover 12 will be unintentionally released from base member 14. In most such instances where separation occurs it has been found to be due to random fracturing of locking fingers 30. In a small number of instances unlocking of a dropped cartridge has been found to occur with no apparent fracturing in the cartridge. In these instances, disengagement is apparently due to the initiation of vibration or flexure which allows all of the fingers to simultaneously flex out of contact with the locking shoulder.

The present invention provides a modification of the cartridge and the shell which satisfactorily eliminates the unintentional disengagement of the locking mechanism due to kinetic shocks which would normally cause the lock to disengage and the base member and cover to separate. Rather than making locking shoulder 22 and supporting disk 20 thicker, stronger, and more rigid, the present invention guards against unintentional opening by removing portions of disk 20 to provide apertures 38 in the disk. Surprisingly, rather than weakening the locking mechanism, the inclusion of apertures 38 in disk 20, as taught herein, provides a more secure and stabilized locking arrangement, as described in further detail hereinafter.

Referring to FIGS. 2 and 3 in one preferred form of the present invention, apertures 38 are comprised of an outer elongated circumferential portion 40 and inner spiral elongated section 42. Aperture portions 40 and 42 are joined and substantially continuous with one another at junction 44. In this embodiment bridge portions 46 cross and partially fill the apertures at junctions 44. As best seen in FIG. 3, bridge 46 is about one-quarter the height of aperture 38. While the exact reason for the lock stabilization noted when apertures are added is not completely understood, it is believed that apertures 38 allow axial displacement of locking shoulder 22 upon the application of substantial axial forces to the cartridge. Depending upon the amount of force applied, this axial displacement serves as a spring or a cushion to eliminate or absorb kinetic shocks which would normally cause the base and shell to disengage.

In the preferred embodiment of FIGS. 2 and 3, bridges 46 provide transverse stiffness to the apertured disk and limit disk deflection in normal locking and unlocking operations and low energy impact situations. One or more bridges 46 have a tendency to preferentially fracture under abnormally high kinetic energy situations. The fracturing of one or more bridges 46 dissipates a great amount of kinetic energy. Once fracturing of bridges 46 occurs, the transverse rigidity of disk 20 is substantially reduced, and shoulder 22 is then capable of substantially greater displacement or oscillating deflection to absorb additional force.

Referring to FIG. 4, a fragmentary exaggerated cutaway view is shown of a cover and base member which are locked together and which have been subjected to sufficient kinetic force to fracture the bridge. Fractured bridge 46 is shown axially displaced, indicative of its position at one point in time after fracturing has occurred.

Regardless of whether bridges 46 fracture or whether apertures 38 merely allow a small degree of axial oscillation during the application of substantial kinetic forces, this arrangement tends to effectively decouple locking shoulder 22 from the balance of cover 12. This decoupling absorbs applied energy which might otherwise cause separation between the locking fingers and locking shoulders.

When an aperture is included in disk 20 supporting locking shoulder 22 in accordance with the present invention, the cartridge functions in a manner which allows normal locking and unlocking operations. Inclusion of an aperture in the disk portion of the cartridge allows it to harmlessly absorb kinetic energy impacts by displacement and oscillation of the locking shoulder. When bridging portions are included in the aperture, then, in extreme high energy impact situations, bridging portions of the apertured disk may fracture allowing increased axial displacement of the locking shoulder to absorb the impact energy without allowing disengagement of the locking mechanism. Despite the disengagement avoidance provided by the present invention, the present apertured disk arrangement still provides sufficient strength to allow thousands of normal locking and unlocking operations without fracturing of the bridges or malfunction due to axial displacement of the locking shoulder.

Another embodiment of the present invention is shown in FIG. 5. In this embodiment, more than one type of aperture is utilized in the cartridge. A first pair of involute spiral apertures 50 are provided diametrically across disk 20 from one another. This spiral has one portion adjacent the cylindrical portion of shell 18 and terminates at a point on disk 20 tangential to locking shoulder 22. A second type of aperture 52 is also present as a pair diametrically across disk 20 from one another. This arrangement of apertures, without bridging members, provides a cartridge which functions substantially the same as the arrangement shown in FIG. 2. The absence of bridges changes the ability for energy absorption which the bridges provide when they fracture. However, the shorter thicker arms defined in the disk by this arrangement of apertures provides sufficient rigidity and energy absorption capability for it to function in a manner which stabilizes the lock against unintentional disengagement due to kinetic shocks.

Choice of materials for the base, cover, and locking mechanism of the cartridge may be such as to avoid wear and generation of debris within the cartridge and the storage apparatus. It may be readily appreciated that the various parts of the locking mechanism may be constructed of war resistant resilient metals or plastics which do not deteriorate or generate particles upon contact and which provide sufficient stiffness to avoid manual unlocking of the cartridge. The choice of such materials is within the skill of the art. Where the cover is of plastic, the apertures and bridges may be formed in the same molding operation as the cover. One preferred cover material is polycarbonate. Preferred locking finger materials include molded polyacetal and polycarbonate. No limitation to any material is intended.

It must also be understood that the preferred embodiments set forth, hereinabove, may be easily modified while leaving the resulting mechanism within the scope of the subject invention. For example, the number of apertures in the present invention may be modified to suit the requirements of the structure and the forces expected to be applied to the cartridge. For example, while embodiments using three or four apertures have been shown, a single substantially spiral aperture which extends nearly 360°, or more, around the disk could be provided to serve a function similar to a plurality of apertures. In accordance with the teaching of this invention, any other number of apertures may be designed to provide the desired balance of strength and resiliency to stabilize the locking mechanism. Similarly, making the apertures wider or narrower, or the disk thicker or thinner, will affect the degree of stiffness and resiliency in the arrangement, as desired. The number of bridges, if any, and the thickness of the bridges in the apertures may be selected to provide the desired degree of rigidity and energy absorption. Bridges which are added to the structure as well as bridges which are integral with the disk may be utilized. Modifications of the shape of the apertures can be provided as desired. As shown in FIG. 5, mixtures of aperture shapes may also be utilized in a single cartridge. Apertures with varying or tapering widths can also be utilized. Additionally, while disk 20 is shown to be substantially flat, it is within the scope of the present invention to bow the disk to provide additional resiliency characteristics to the apparatus. Also, disk 20 can be mechanically connected to cover 12 rather than a monolithic portion of the cover.

It is therefore seen that the objects of this invention have been achieved. A cartridge with a stabilized locking mechanism has been detailed. The details of the cartridge including the apertured disk in the cover have been described. A modified shell cover including such an apertured disk have been detailed. Finally, a locking mechanism stabilization arrangement has been described.

While the invention has been particularly shown and described with reference to preferred embodiments thereof, it will be understood by those skilled in the art that various changes in form and details may be made therein without departing from the spirit and scope of the invention.

What is claimed is:

1. In a cartridge for storing and handling a flexible wound web, said cartridge including in combination:
   a base member, a cover member and locking means for releasably locking said members in a closed position;

said base member comprising a hub having a first and second end and adapted for winding a web thereon;

said cover member being generally cupshaped with a disk end portion extending radially around a central annular opening, said cover defining a web-receiving chamber around said hub when said base and cover members are in a closed position;

said locking means including a locking shoulder integral with the annular opening in the disk portion of said cover member and a plurality of flexible locking fingers integral with the second end of said hub, said fingers and said shoulder normally cooperating in locking engagement to secure said base and cover together in a closed position, said locking shoulder and locking fingers being disengageable to permit separation of said base member from said cover member, wherein the improvement comprises:

at least one non-radial aperture generally around said disk portion of said cover member to provide stabilization to the locking means to substantially prevent unintentional disengagement due to kinetic shocks.

2. The cartridge of claim 1 wherein a plurality of non-radial apertures is spaced around the disk end of said cover.

3. The cartridge of claim 1 wherein one or more bridge member extends across one or more aperture.

4. The cartridge of claim 1 wherein magnetic record media in web form is wound around the hub of said base member in the web-receiving chamber defined when said base and cover members are in a closed position.

5. The cartridge of claim 1 wherein said locking means are designed to disengage normally only in response to mechanical means separate and distinct from said cartridge.

6. In a cartridge for storing and handling a flexible wound web, said cartridge including in combination;

a base member, a cover member, and locking means for releasably locking said members in a closed position for disengagement by a mechanism separate from said cartridge;

said base member including a cylindrical hub having a first and second end and adapted for winding web thereon, with a fixed base plate extending radially outward from said hub at said first end;

said cover member being generally cup-shaped with a disk end portion extending radially around a central annular opening and having an axially extending flange proximate its outer periphery, said flange terminating in an end portion extending to and engaging said base plate when said base and cover members are in a closed position;

said locking means including a first locking member integral with the central annular opening of the end portion of said cover member, and a second locking member integral with the second end of said hub, said first locking member being a locking shoulder integral with the annular opening in the disk end portion of said cover member and said second locking member including a plurality of flexible locking fingers integral with the second end of said hub, said locking members normally cooperating in interlocking engagement to secure said cover and base members together in a closed position, said locking members designed to disengage normally only in response to mechanical means separate and distinct from said cartridge to permit separation of said cover member from said base member, wherein the improvement comprises:

a plurality of non-radial apertures spaced around the disk end of said cover member, each aperture having a bridge member extending across it to provide stabilization to the locking means to substantially prevent unintentional disengagement due to kinetic shocks.

7. The cartridge of claim 6 wherein magnetic record media in web form is wound around the hub of said base member.

8. In a locking system not normally disengagable without the use of a separate tool, a locking arrangement for preventing unintended locking member disengagement due to kinetic shocks comprising:

a disk extending around a central annular opening, said opening including a locking shoulder;

a plurality of flexible fingers for locking engagement with said shoulder; and at least one elongate generally non-radial aperture through said disk, the remaining portions of said disk forming one or more non-radial arms for allowing deflection of the disk in response to axial force thus stabilizing said locking system to substantially prevent unintentional disengagement due to kinetic shocks.

9. The locking system of claim 8 wherein a plurality of elongated non-radial apertures is included in the disk to form a plurality of non-radial arms.

10. The locking system of claim 9 wherein one or more bridge member extends across one or more aperture.

11. In a cartridge for storing a wound web, said cartridge including in combination a cover member, a base member, and locking means for releasably locking said members together to form a web-receiving enclosure, the improvement wherein the locking means comprises:

an annular locking shoulder carried by a disk in said cover member;

a plurality of flexible latching fingers secured to said base member; and at least one non-radial aperture generally around said disk in said cover member.

* * * * *

UNITED STATES PATENT AND TRADEMARK OFFICE
CERTIFICATE OF CORRECTION

PATENT NO. : 3,937,325
DATED : February 10, 1976
INVENTOR(S) : Thomas W. Dodge et al.

It is certified that error appears in the above-identified patent and that said Letters Patent are hereby corrected as shown below:

Column 1, line 27, "1872" should be --1972--.

line 29, "3,354,604" should be --3,854,604--.

Column 6, line 6, "war" should be --wear--.

line 55, "have" should be --has--.

Claim 6, Col. 7, line 46, "web" should be --a web--.

Signed and Sealed this

Twenty-sixth Day of October 1976

[SEAL]

Attest:

RUTH C. MASON
*Attesting Officer*

C. MARSHALL DANN
*Commissioner of Patents and Trademarks*